Patented Dec. 14, 1948

2,456,358

UNITED STATES PATENT OFFICE 2,456,358

THERMOPLASTIC RESINS AND PROCESS OF MAKING

Harry L. Allen, Philadelphia, Pa., and Earl G. Kerr, Haddonfield, N. J., assignors to Allied Chemical & Dye Corporation, New York, N. Y., a corporation of New York No Drawing. Application October 31, 1945, Serial No. 625,960

8 Claims. (Cl. 260—43)

This invention relates to resins and more particularly to novel resinous products and a process of producing the same.

The invention has as an object to provide novel resinous reaction products of polymerizable compounds of the indene-coumarone-styrene type, maleic anhydride, phenols and formaldehyde, which products possess properties rendering them particularly adapted for blending with cellulose derivatives such as cellulose acetate and cellulose nitrate and for other purposes. It is a further object of the invention to provide a process for the manufacture of such resins. Other objects and advantages will appear hereinafter.

The resins of the invention are made by reacting one or more polymerizable materials selected from the group consisting of indene, coumarone and styrene and their homologs with maleic anhydride, a phenol and formaldehyde. When the reaction is complete, the resin may be recovered from the reaction mixture by distillation, preferably under vacuum. Preferably, from 1 to 35 parts by weight of polymerizable material, from 5 to 30 parts of maleic anhydride, from 25 to 75 parts of phenolic material and from 0.4 to 1.0 mol of formaldehyde for each mol of the other reactants are employed.

The resins of the invention are thermoplastic, usually having a melting point within the range of 75° to 100° C., and are obtained in high yields. They are hard, transparent products which are insoluble in xylol and soluble in ethyl alcohol. The resins are compatible with cellulose derivatives such as cellulose acetate and cellulose nitrate, and may advantageously be blended with these cellulose derivatives to form coating compositions. Very few resins heretofore known are compatible with cellulose acetate and hence this property of the resinous products of the invention renders them highly desirable for many applications.

Oil fractions boiling within the range of 120° to 210° C. containing the polymerizable constituents are preferably utilized as the source of such polymerizable compounds in carrying out the invention. Such oils are formed in the distillation of coal and carburetion of water gas and are obtained during the coking of coal, distillation of coal tar or water gas tar, or may be collected in coal gas and water gas distribution systems. Solvent naphtha, coke oven light oil, drip oil and water gas tar distillates are representative of such oils. These oils contain varying but substantial amounts of indene, coumarone, styrene and their homologs and ordinarily contain mixtures of two or more of such compounds. The oils may be fractionated to obtain fractions in which different individual polymerizable compounds predominate. Thus, for example, fractions boiling within the range 150° to 210° C. ordinarily contain indene as the chief polymerizable constituent; drip oil fractions boiling within the range 120° to 150° C. may contain styrene as the chief polymerizable constituent; and fractions boiling within the range of 150° to 210° C. containing larger proportions of styrene homologs, such as methylstyrene, and coumarone together with some styrene and indene, may be selected, the proportions of the individual polymerizable compounds depending on the source of the oil and the particular boiling range of the fraction. Preferably, fractions boiling within the range 160° to 190° C. containing indene as the chief polymerizable constituent are employed in the manufacture of the resins. Instead of utilizing such oil fractions, the polymerizable materials may be employed in substantially pure form, e. g. synthetic indene or synthetic styrene, or homologs such as methylstyrene or methylindene may be utilized. Mixtures of such synthetic materials may also be employed. In order to aid in controlling the reaction, it is preferred to dilute the polymerizable material with an inert solvent such as benzene, toluene, xylene or other hydrocarbon solvent which can be readily removed from the resinous product by distillation.

As the phenolic reagent, either phenol or substituted phenols such as phenol homologs, e. g. the cresols, xylenols and higher-boiling tar acids, may be utilized. The phenolic reagent may be employed in substantially pure form or tar acid mixtures such as commercially available mixtures of cresols and xylenols, may be utilized.

The formaldehyde may be employed in any desired form. Commercially available aqueous formaldehyde solutions are preferably utilized. Gaseous anhydrous formaldehyde and paraformaldehyde are also suitable and are included within the scope of the term "formaldehyde" as used herein. The amount of formaldehyde employed is ordinarily from 0.4 to 1.0, preferably from 0.4 to 0.75 mol for each mol of the other reactants introduced into the reaction mixture.

The properties of the resins may be varied by varying the amount of maleic anhydride incorporated in the reaction mixture. Higher proportions of maleic anhydride within the limits hereinabove disclosed tend to produce products having a higher degree of compatibility with nitrocellulose than resins containing lower proportions of maleic anhydride. To produce resins of high compatibility with cellulose nitrate, the reactants are preferably mixed in the proportions of from 25 to 35 parts by weight of polymerizable material, from 20 to 30 parts of maleic anhydride, from 35 to 50 parts of phenolic material and from 0.4 to 0.6 mol of formaldehyde for each mol of the other reactants.

The reaction may be carried out by introducing the polymerizable material, maleic anhydride, phenol and formaldehyde into a reaction vessel and heating the reaction mixture to a temperature within the range of 90° to 110° C. until the reaction is complete. When the reaction is complete, the reaction mixture is distilled, preferably under vacuum, e. g. absolute pressure of 0" to 10" of mercury to drive off the water, unreacted hydrocarbons and other unreacted materials which may be present.

The following examples are illustrative of the invention. In the examples parts are given by weight.

*Example 1.*—100 parts of a carbolic hydrocarbon oil fraction having a distillation range of 170° to 195° C. containing 60% by weight (about 60 parts) of polymerizable material, chiefly indene, were introduced into a reaction vessel with 60 parts of maleic anhydride, 100 parts of phenol, and 80 parts of 37% aqueous formaldehyde solution, and the mixture was heated to about 100° C. for about 10 minutes. The reaction mixture was distilled under absolute pressure of 2" of mercury until 194 parts of transparent resin of a melting point of 89° C. were obtained as residue. The resin was of light amber color and was soluble in ethyl alcohol and insoluble in xylol.

*Example 2.*—100 parts of a carbolic hydrocarbon oil fraction having a distillation range of 170° to 195° C. containing 60% by weight (about 60 parts) of polymerizable material, chiefly indene, 25 parts of maleic anhydride, 100 parts of phenol and 80 parts of 37% aqueous formaldehyde solution were introduced into a reaction vessel and heated to about 100° C. for 50 minutes. At the end of this period the reaction mixture was distilled under absolute pressure of 1½" of mercury until 186 parts of transparent resin of a melting point of 78° C. were obtained as residue. The resin was of light amber color, was soluble in ethyl alcohol and insoluble in xylol.

The resinous products of the above examples are compatible with cellulose acetate and cellulose acetobutyrate. Solutions of 1 part by weight of these materials and 1 part of the resins in appropriate solvents dry to hard, clear, transparent coating films. The resins are also compatible with cellulose nitrate; thus, for example, solutions of 1 part of the resin of Example 1 and 2 parts of cellulose nitrate in appropriate solvents dry to hard, clear, transparent coating films. The resin of Example 1 was somewhat more compatible with nitrocellulose than that of Example 2. This may be attributed to the higher proportion of maleic anhydride employed in making the resin of Example 1.

The melting points given herein were determined by the cube-in-mercury method described in "Protective and Decorative Coatings," vol. 1, pages 366–367, by J. J. Matiello, copyright 1941, published by John A. Wiley & Sons, Inc., New York, New York.

Since certain changes may be made without departing from the scope of the invention, it is intended the above description shall be interpreted as illustrative and not in a limiting sense.

We claim:

1. A process of making resins which comprises reacting together at an elevated temperature from 1 to 35 parts by weight of at least one polymerizable material selected from the group consisting of indene, coumarone, styrene and their homologs boiling up to 210° C., from 5 to 30 parts by weight of maleic anhydride, from 25 to 75 parts by weight of phenolic material of the tar-acid group and from 0.4 to 1.0 mol of formaldehyde for each mol of said polymerizable material, maleic anhydride and phenolic material.

2. A process of making resins which comprises heating to a temperature within the range 90° to 110° C., a mixture of an oil containing from 1 to 35 parts by weight of at least one polymerizable material selected from the group consisting of indene, coumarone, styrene and their homologs boiling up to 210° C., from 5 to 30 parts by weight of maleic anhydride, from 25 to 75 parts by weight of phenolic material of the tar-acid group and from 0.4 to 1.0 mol of formaldehyde for each mol of said polymerizable material, maleic anhydride and phenolic material.

3. A process as defined in claim 2 in which the polymerizable content of the oil is at least chiefly indene.

4. A resinous product prepared by the process of claim 3.

5. A process as defined in claim 2 in which the polymerizable content of the oil is at least chiefly indene and the phenolic material is phenol.

6. A resinous product prepared by the process of claim 5.

7. A resinous product prepared by the process of claim 1.

8. A resinous product prepared by the process of claim 2.

HARRY L. ALLEN.
EARL G. KERR.

REFERENCES CITED

The following references are of record in the file of this patent:

UNITED STATES PATENTS

| Number | Name | Date |
|---|---|---|
| 2,375,960 | Stoops et al. | May 14, 1945 |